United States Patent
Deng et al.

(10) Patent No.: US 8,272,679 B2
(45) Date of Patent: Sep. 25, 2012

(54) DOOR SPACER BLOCK DESIGN FOR SIDE IMPACT PROTECTION

(75) Inventors: Zhibing Deng, Northville, MI (US);
Joseph Edward Abramczyk, Farmington Hills, MI (US); Djamal Eddine Midoun, Ann Arbor, MI (US);
Richard Lee Matson, Canton, MI (US);
Matthew Ammons, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 12/712,259

(22) Filed: Feb. 25, 2010

(65) Prior Publication Data

US 2011/0204679 A1    Aug. 25, 2011

(51) Int. Cl.
*B60J 5/00*    (2006.01)
(52) U.S. Cl. .................... 296/146.6; 296/187.12
(58) Field of Classification Search ............... 296/146.6, 296/187.03, 187.12; 293/102; 188/371, 188/376, 377
See application file for complete search history.

(56) References Cited

U.S. PATENT DOCUMENTS

| | | | |
|---|---|---|---|
| 4,958,884 A * | 9/1990 | Gold | 296/187.12 |
| 5,599,057 A | 2/1997 | Hirahara et al. | |
| 6,631,940 B2 * | 10/2003 | Dauvergne et al. | 296/146.6 |
| 7,631,925 B2 * | 12/2009 | Tanaka et al. | 296/146.6 |
| 7,992,920 B2 * | 8/2011 | Deng et al. | 296/146.6 |
| 2006/0197359 A1 | 9/2006 | Yamasaki | |
| 2007/0145771 A1 * | 6/2007 | Tanaka et al. | 296/146.6 |
| 2008/0157564 A1 * | 7/2008 | Thenier et al. | 296/187.03 |

FOREIGN PATENT DOCUMENTS

| | | |
|---|---|---|
| EP | 1323560 | 7/2003 |
| EP | 1725442 A1 | 11/2006 |

* cited by examiner

*Primary Examiner* — Lori Lyjak
(74) *Attorney, Agent, or Firm* — Shook, Hardy & Bacon LLP

(57) ABSTRACT

A strategically located door spacer block for transferring door beam bend/kink away from the occupant seating position is provided. The door spacer block is positioned between the door inner panel and the door outer panel and is aligned with the door beam. The door spacer block of the disclosed invention is placed between door inner panel and the door outer panel with the intention of minimizing the effect that the bend/kink in the door beam has on the occupant loading. The door spacer block engages the door beam and transfers the effective position of the kink of the door structure in a side impact away from the occupant seating position, thus freeing up crushable space in the occupant loading zone. The door spacer block of the disclosed invention eliminates or delays the loading of the beam surface to the pelvis bolster material, thus enabling additional free-crush space and allowing for a lower force transfer to the occupant.

19 Claims, 5 Drawing Sheets

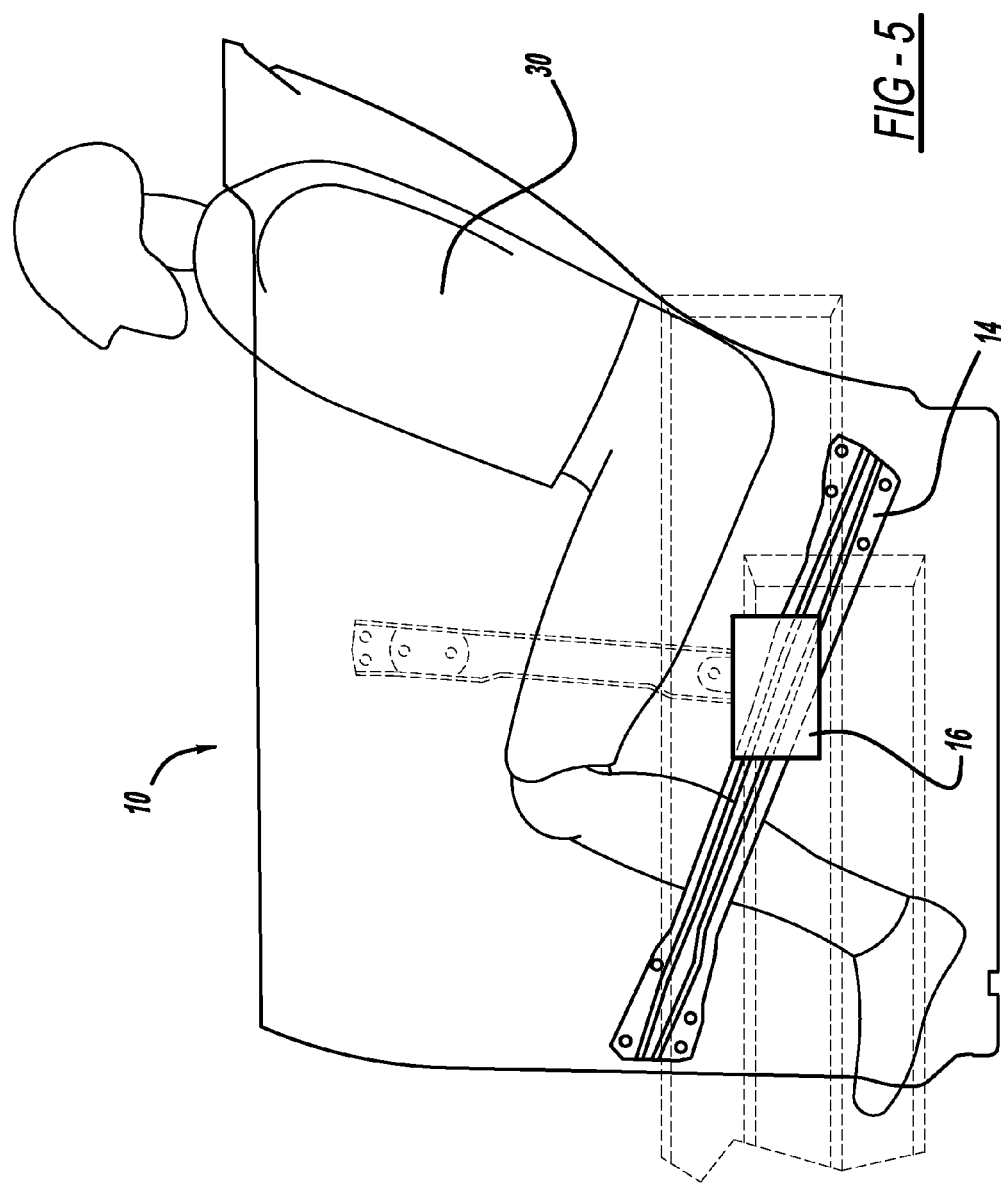

DOOR SPACER BLOCK DESIGN FOR SIDE IMPACT PROTECTION

TECHNICAL FIELD

The present invention relates generally to door spacer block structures for use with vehicle doors. More particularly, the present invention relates to a door spacer block formed from a rigid material. The door spacer block is placed between the door inner panel and the door outer panel and is aligned with the door beam. In the event of an impact on the door this arrangement transfers the door beam bend/kink away from the occupant seating position.

BACKGROUND OF THE INVENTION

Vehicle doors are typically constructed with two or more panels attached to the door frame, including an exterior or outer panel for shielding the passenger compartment from the elements, and an inner door panel which provides structural support. A trim panel is usually fastened to the inner door panel facing the passenger compartment and shields the vehicle occupants from internal door components, such as the window, the window regulator and the door locks. The trim panel can also provide aesthetic qualities to the interior passenger compartment as well as ergonomic features, for example, easily accessible door handles, mirror and window controls, and the like.

It is known that vehicles may collide with obstacles during operation. Frequently the door structure is subjected to a large intrusion. As a result, automotive vehicles have been provided with various structural upgrades and restraint systems to lessen the effects of a collision type impact on an occupant compartment of the vehicle. Particularly, to lessen the effects of a side collision type impact of the vehicle occupant seating area, some vehicle door constructions may include a door intrusion guard beam, side bolsters of foam or honeycomb construction, or other body side structural upgrades. Another known arrangement provided in response to the door impact has been developed to align with the lateral load paths of the vehicle, such as an underbody cross member or a bolt-on load path such as the SIPS tube.

One arrangement, the pelvis pusher block, is typically attached to the door beam and engages the energy management foam (or other material) in such a way as to apply a pre-load to the occupant.

While such structural upgrades provide certain advantages, often they are relatively expensive and weighty. In addition, many of the known designs are effective in the instance of lateral intrusion but not as effective in the instance of longitudinal intrusion.

Accordingly, as in so many areas of vehicle technology, there is room in the art of vehicle door design for an alternative configuration to known door structures which provides effective protection regardless of the direction of impact while maintaining relatively low manufacturing and assembly costs.

SUMMARY OF THE INVENTION

The present invention generally provides a vehicle door assembly in which a door spacer block is positioned between the door inner panel and the door outer panel and is aligned with the door beam. According to this arrangement in the event of an impact against the vehicle door assembly the door beam bend or kink which often occurs in such an impact event is transferred away from the occupant seating position.

The door spacer block may be composed of any of a variety of materials, including a rigid plastic or a sheet metal configuration of sufficient strength so as to avoid buckling.

Particularly, the door spacer block of the disclosed invention is placed between the door inner panel and the door outer panel with the intention of minimizing the effect that the bend/kink in the door beam has on the occupant loading. The door spacer block engages the door beam and transfers the effective position of the kink of the door structure in a side impact away from the occupant seating position, thus freeing up crushable space in the occupant loading zone. Unlike the above-mentioned pelvis pusher block which provides a pre-load to the occupant, the door spacer block of the disclosed invention is designed to eliminate or delay the loading of the beam surface to the pelvis bolster material, thus enabling additional free-crush space and allowing for a lower force transfer to the occupant.

Unlike the above-noted earlier door block designs which provide additional components to create new lateral load paths, the door spacer block is not intended to provide additional load transfer properties from the impacting barrier to the lateral load paths of the vehicle. Instead, the door spacer block of the disclosed invention is used as a means to effectively shift the local kink of a door beam from one location on the door to another. The door spacer block may be attached to the door inner module and aligned with the door beam forward of the occupant pelvic region.

The door spacer block design of the disclosed invention demonstrates a shift in the local deformation away from the occupant pelvis region and a reduction in pelvis forces of up to 2.4 kN. In addition, while the door spacer block of the disclosed invention has primary application with the front door of the vehicle, it may be suitable for rear door application. In such instance the door spacer block may be affixed to the rear door beam and aligned with the window regulator rail.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 illustrates the door assembly of the disclosed invention from the outside in partial transparent view showing the door spacer block of the disclosed invention in relation to the rest of the door as well as an adjacent diagrammatic view of a vehicle occupant.

DETAILED DESCRIPTION OF THE PREFERRED EMBODIMENT

Figure 1:
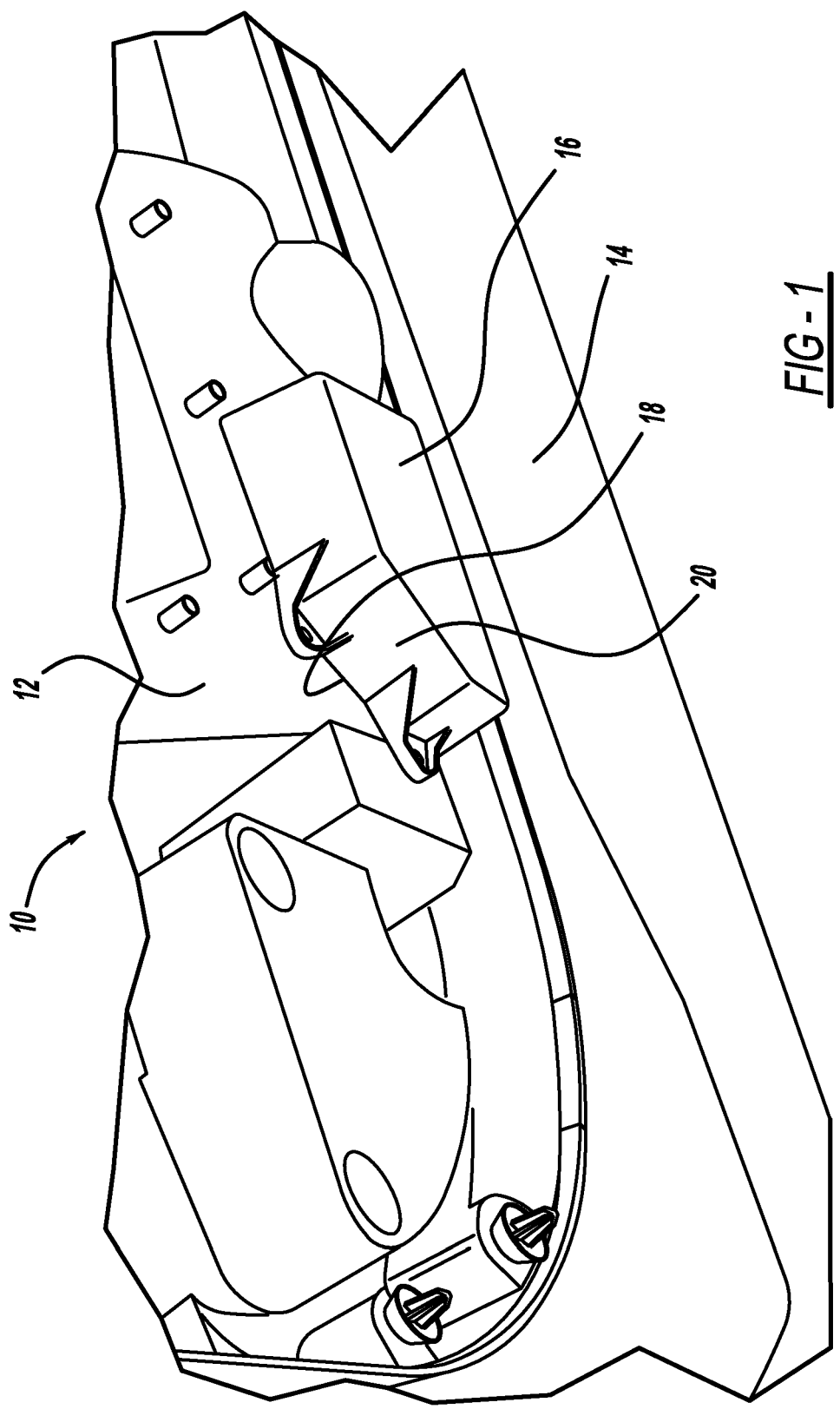
FIG. 1 illustrates a perspective view of the interior of a door assembly incorporating the door spacer block of the disclosed invention in place on the door inner panel and illustrating the adjacent door beam.

In the following figures, the same reference numerals will be used to refer to the same components. In the following description, various operating parameters and components are described for different constructed embodiments. These specific parameters and components are included as examples and are not meant to be limiting.

Referring to FIG. 1, a perspective view of the interior of a door assembly, generally illustrated as 10, according to the disclosed invention is shown. The vehicle door 10 may be either a front door of a vehicle or the rear door of a vehicle. The vehicle door 10 includes an inner panel 12 and an adjacent door guard beam 14. An outer panel (not shown) is positioned adjacent the door inner panel 12 and is joined therewith in a conventional fashion to form a space therebetween. The shape and function of the door guard beam 14 is known in the art and typically extends from one side of the door to the other.

A door spacer block 16 is provided between the door inner panel 12 and the door guard beam 14. The body of the door spacer block 16 is generally elongated so as to provide effective alignment with the door guard beam 14. The door spacer block 16 has an inner portion 18 and an outer portion 20. The inner portion 18 of the door spacer block 16 defines an inner door panel contact surface while the outer portion 20 of the door spacer block 16 defines a door guard beam contact surface.

The configuration of the door block illustrated herein is for demonstrative purposes only and is not intended as being limiting.

The door spacer block 16 may be composed of a variety of materials which are structurally rigid and would be generally resistant to impacts. Such materials may include a polymerized material such as ABS plastic or a sheet metal configuration of sufficient strength so as to avoid buckling. The choice of material is regulated only by the fact that regardless, of the material, the door spacer block 16 must be stiff so that it is not deformable on side impact.

The door spacer block 16 is shown fitted to the door inner panel 12. Attachment of the door spacer block 16 is made in a known manner typically using conventional fasteners such as screws or bolts. While the door spacer block 16 is shown as being fitted to the door inner panel 12 it may be fitted to the door guard beam 14 as well.

Regardless of either the method of attachment of the door spacer block 16 or the place of attachment (the door inner panel 12 or the door guard beam 14) the door spacer block 16 is oriented so as to be in maximum alignment with the door guard beam 14 such that the widest part of the body of the door spacer block 16 is positioned adjacent the door guard beam 14.

Figure 2:
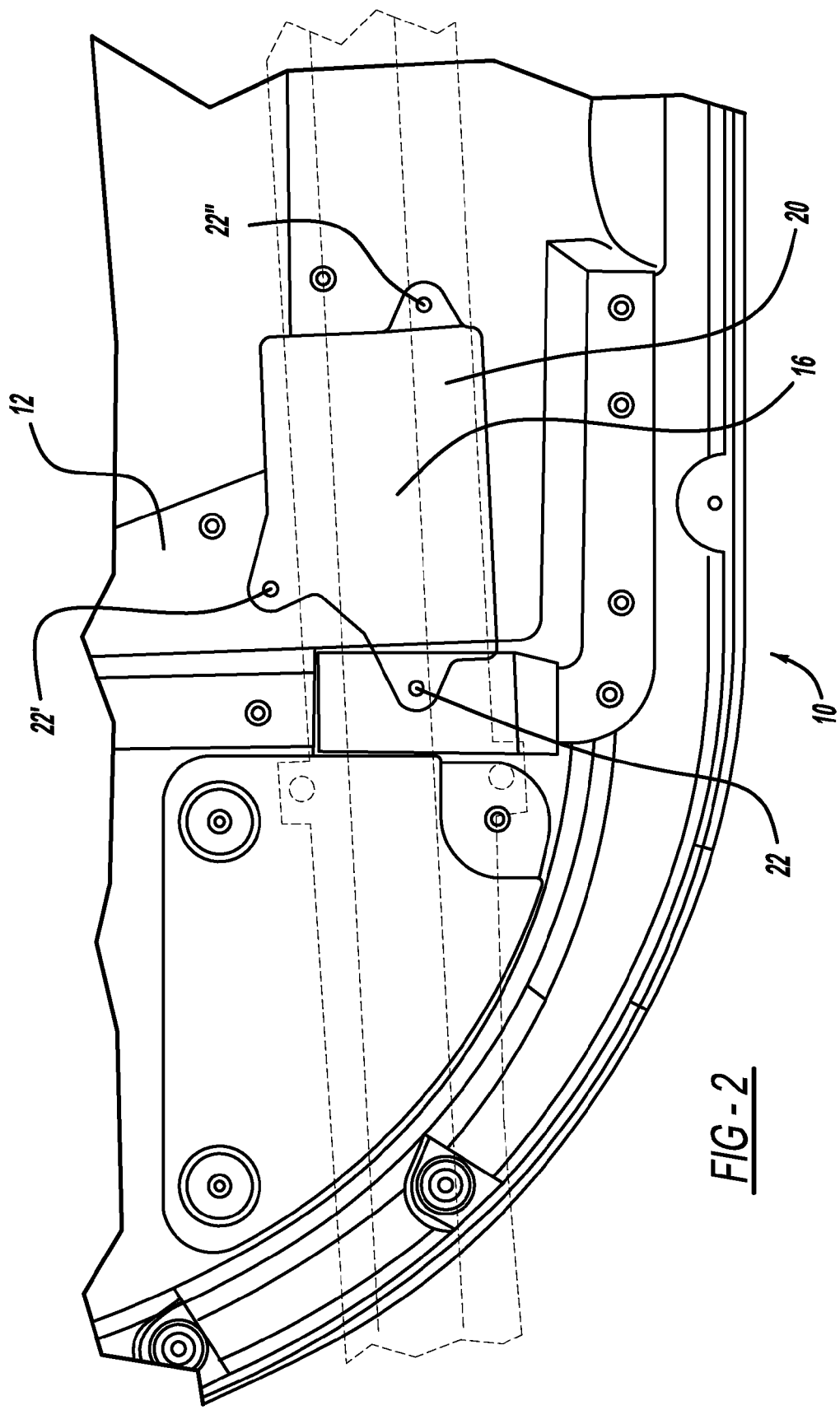
FIG. 2 illustrates a sectional view of a door assembly of the disclosed invention incorporating the door spacer block viewed from the outside and shown without the outer door outer panel.

The configuration and placement of the door spacer block 16 is also demonstrated in FIG. 2 which illustrates an outside view of the vehicle door 10 shown without the outer panel of the vehicle door 10. As illustrated therein, the door spacer block 16 is attached to the inner door panel 12 by a series of conventional fasteners 22, 22', and 22". The door spacer block 16 is positioned on the door inner panel 12 such that the wider part of the body of the door spacer block 16 is oriented more or less horizontally and is thus generally aligned with the door guard beam (not shown).

Figure 3:
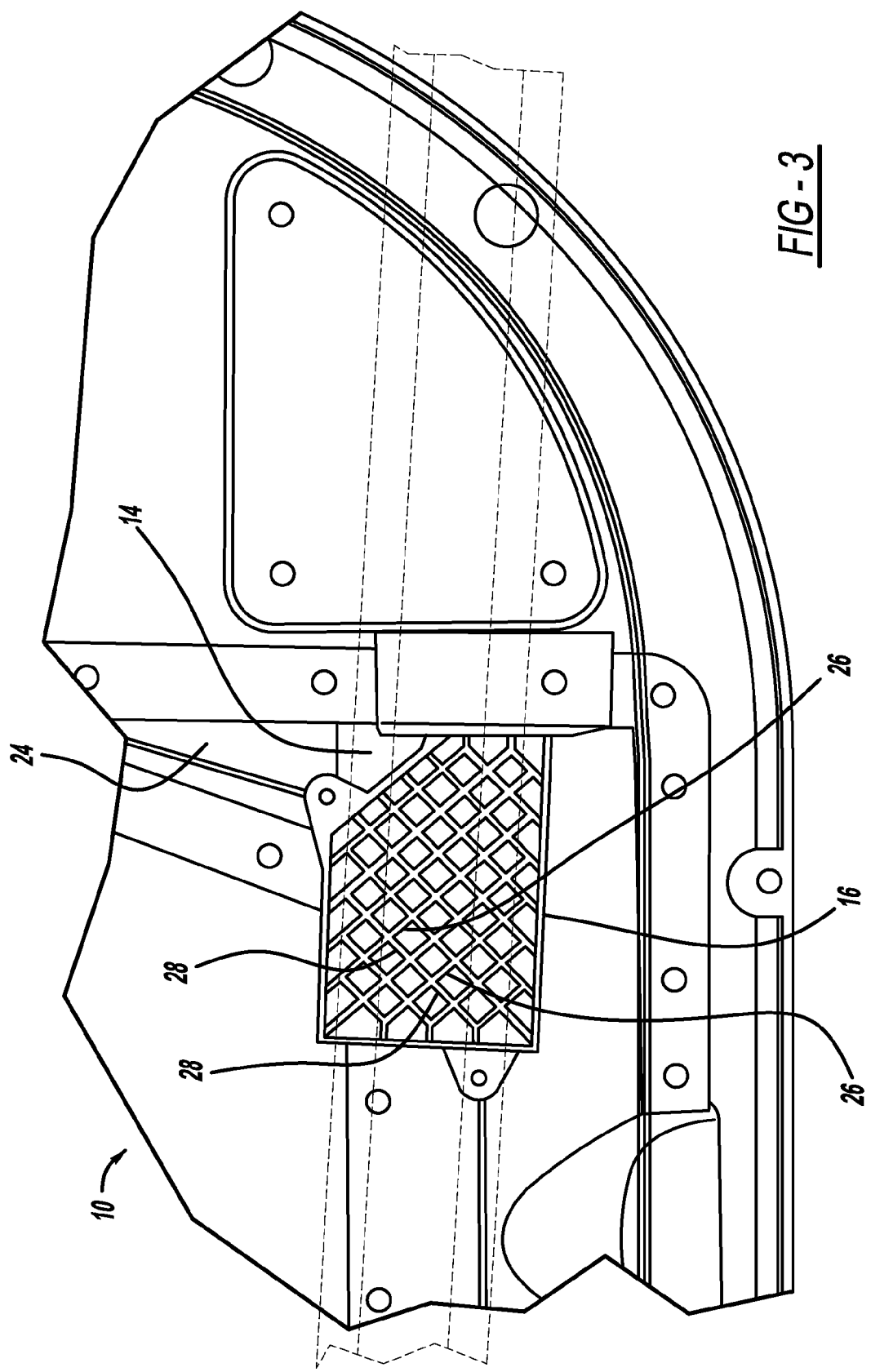
FIG. 3 illustrates a sectional view of a door assembly of the disclosed invention incorporating the door spacer block viewed from the inside and shown without the outer door inner panel.

FIG. 3 illustrates a sectional view of a door assembly 10 of the disclosed invention incorporating the door spacer block 16 viewed from the inside and shown without the outer door inner panel 12. The door outer panel 24 is illustrated as is the door guard beam 14 disposed generally between the door spacer block 16 and the door outer panel 24.

As noted above, the door spacer block 16 may be made from any of several materials, including a plastic. If the latter material is the material of choice, the door spacer block 16 and its material may be designed and selected to maximize strength while minimizing the amount of material and thus minimizing overall weight. Thus the door block spacer 16 illustrated in FIG. 3 is formed with a series of walls 26 which run in parallel in a first direction and which intersect with a series of walls 28 which run in parallel in a second direction. The number and orientation of the intersecting walls 26 and 28 may be reconfigured and varied as needed thus the illustrated configuration is only suggestive and is not intended as being limiting.

Figure 4:
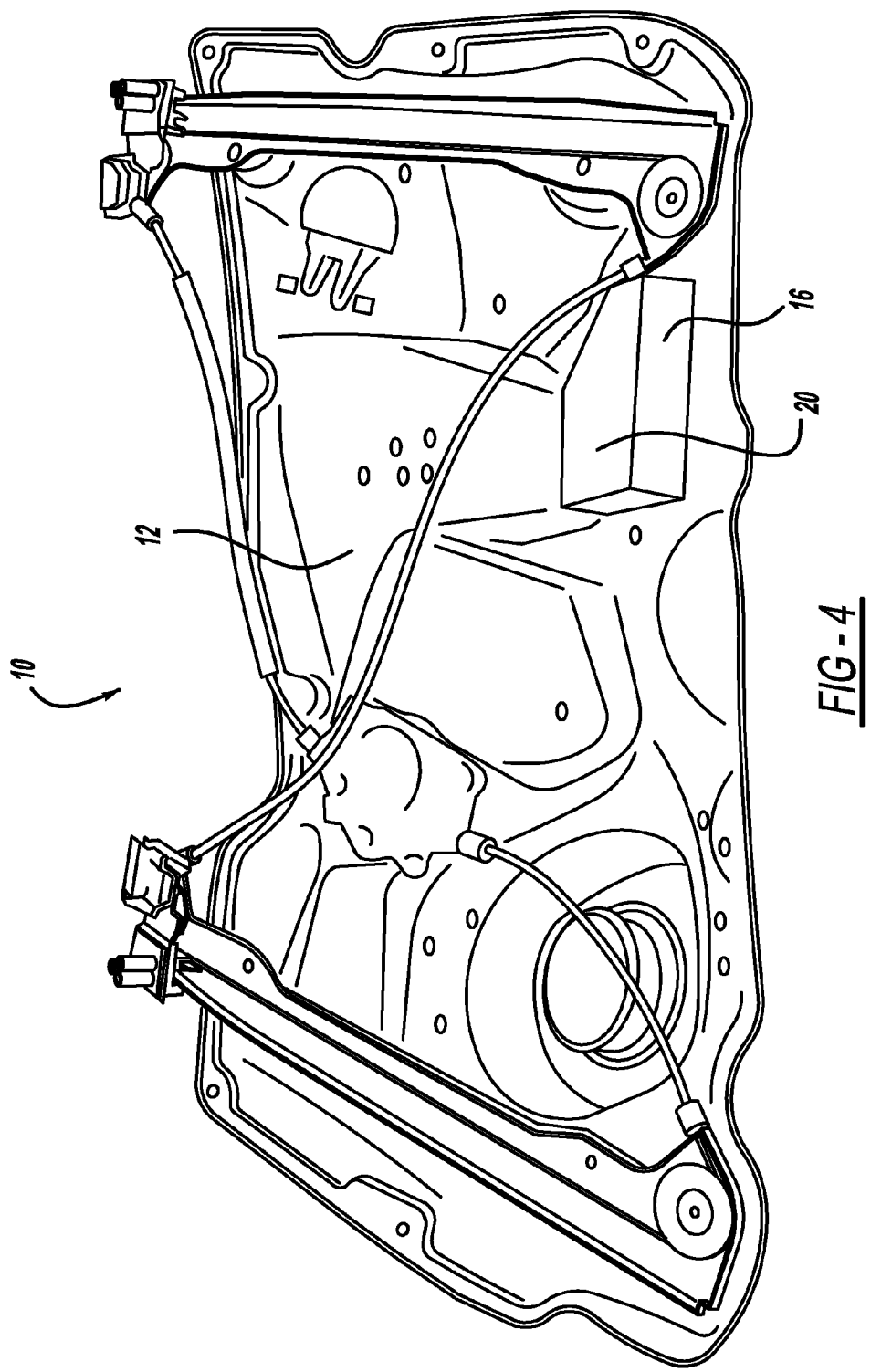
FIG. 4 illustrates a perspective view of the outer side of the door inner panel illustrating the door spacer block of the disclosed invention in place.

FIG. 4 illustrates a whole inner door panel 12 of the vehicle door 10 and more clearly shows the actual placement of the door spacer block 16 thereupon. The preferred elongated body of the door spacer block 16 is more clearly seen in this figure.

FIG. 5 illustrates the vehicle door 10 viewed from the outside with the outer panel removed. The door spacer block 16 is shown placed between the door guard beam 14 and the window rail. The length-wise orientation of the door spacer block 16 and its overall alignment with the door guard beam 14 is clearly shown. An occupant 30 is shown in broken lines. This figure also illustrates placement of the door spacer block 16 relative to the occupant 30 such that the door spacer block 16 is in fact positioned below the occupant 30 when in the seated position.

With the door spacer block 16 of the disclosed invention positioned between the door inner panel 12 and the door outer panel 24 and aligned with the door guard beam 14 at a position forward of the pelvic region of the occupant 30, the door spacer block 16 minimizes the effect that the bend/kink in the door beam has on the occupant loading in an impact event involving the vehicle door. In a side impact, the door spacer block 16 engages the door guard beam 14 and transfers the effective position of the kink of the vehicle door 10 away from the occupant 30 while seated, thus freeing up crushable space in the occupant loading zone. Unlike the above-mentioned pelvis pusher block, which is typically attached to the door beam and engages the energy management foam (or other material) in such a way as to apply an earlier load to the occupant 30, the door spacer block 16 is designed to eliminate or delay the loading of the beam surface to the pelvis bolster material. This enables additional free-crush space and allows for a lower force transfer to the occupant 30.

While the position of the door spacer block 16 of the disclosed invention is shown forward of the pelvic region of the occupant 30, it should be understood that similar positive results can be achieved by alternative placement of the door spacer block 16 and the door guard beam 14. For example, the door spacer block 16 and the door guard beam 14 may be positioned higher in the vehicle door 10 such as adjacent the occupant's pelvic region or above the occupant's pelvic region.

Unlike prior efforts to solve the problem faced and overcome by the disclosed invention (such as an underbody cross member or bolt-on load path such as the SIPS tube), the door spacer block 16 is not intended to provide additional load transfer properties from the impacting barrier to the lateral load paths of the vehicle. Rather, the disclosed door spacer block 16 aligned as it is with the door guard beam 14 effectively shifts the local kink of a door guard beam 14 from one location on the door 10 to another.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door for a vehicle comprising:
an inner panel;
an outer panel;
a door beam having a long axis, said beam being between said inner and outer panels; and
a door spacer block having a body with a length and a height, said spacer positioned substantially between said outer panel and said beam, said length being greater than said height, said length of said body being substantially aligned with said long axis of said beam.

2. The vehicle door of claim 1 wherein the vehicle includes a seat that can be occupied by a vehicle occupant and wherein said door spacer block is positioned below the occupant when the occupant is seated.

3. The vehicle door of claim 1 wherein said inner and outer panels are joined.

4. The vehicle door of claim 1 wherein said door spacer block is attached to said inner panel.

5. The vehicle door of claim 4 further including a bolt fastener to attach said door spacer block to said inner panel.

6. The vehicle door of claim 1 wherein said door spacer block is composed of a polymerized material.

7. The vehicle door of claim 6 wherein said door spacer block is composed of a first series of parallel walls and a second series of parallel walls, said first and second series of parallel walls intersecting.

8. The vehicle door of claim 1 wherein said door block is composed of a metal.

9. The vehicle door of claim 5 wherein said metal is sheet metal.

10. A door for a vehicle having a seat for an occupant, the door comprising:
an inner panel;
an outer panel;
a door beam having a long axis; and
a door spacer positioned substantially between said outer panel and said beam, said door spacer block being generally aligned with said beam, said door spacer block being positioned below the occupant when seated, said door spacer block being composed of a top wall, bottom wall, a pair of side walls, a first series of parallel walls and a second series of parallel walls, said first and second series of parallel walls intersecting, said first series of parallel walls and said second series parallel walls being generally diagonal with respect to said top, bottom and side walls.

11. The door for a vehicle of claim 10 wherein said door spacer block has a body with a length and a height, said length being greater than said height, said length of said body being substantially aligned with said long axis of said beam.

12. The vehicle door of claim 10 wherein said inner and outer panels are joined.

13. The vehicle door of claim 10 wherein said door spacer block is attached to said inner panel.

14. The vehicle door of claim 13 further including a bolt fastener to attach said door spacer block to said inner panel.

15. The vehicle door of claim 10 wherein said door spacer block is composed of a polymerized material.

16. The vehicle door of claim 10 wherein said door block is composed of a metal.

17. The vehicle door of claim 16 wherein said metal is sheet metal.

18. A method for minimizing the effect of a kink in a door beam of a vehicle door on occupant loading in an impact event comprising a door spacer block, the method comprising the steps of:
forming a door block spacer having a body with a length and a height, said length being greater than said height;
fitting said door spacer block between a vehicle outer panel and a door beam at a position in alignment with said door beam and below an occupant seated in an adjacent vehicle seat, said door beam having a long axis, said length of said body being substantially aligned with said long axis of said beam.

19. The method of claim 18 including the step of attaching said door spacer block to the inner panel of the vehicle door.

* * * * *